O. H. JEWELL.

Assignor to the JEWELL PURE WATER COMPANY.

FEED WATER PURIFIER.

No. 10,963. Reissued Oct. 16, 1888.

Witnesses.
B. M. Whitaker.
Jonne Miller.

Inventor:
Omar H. Jewell.
By Coburn & Thacher
Attys.

UNITED STATES PATENT OFFICE.

OMAR H. JEWELL, OF CHICAGO, ILLINOIS, ASSIGNOR TO THE JEWELL PURE WATER COMPANY, OF SAME PLACE.

FEED-WATER PURIFIER.

SPECIFICATION forming part of Reissued Letters Patent No. 10,963, dated October 16, 1888.

Original No. 377,386, dated February 7, 1888. Application for reissue filed April 25, 1888. Serial No. 271,847.

*To all whom it may concern:*

Be it known that I, OMAR H. JEWELL, a citizen of the United States of America, residing at Chicago, in the county of Cook and State of Illinois, have invented certain new and useful Improvements in Feed-Water Purifiers, of which the following is a specification, reference being had therein to the accompanying drawings.

This invention relates to devices for purifying feed-water for steam-boilers, to prevent sediments and incrustations in such boilers; and it has for its object to provide an apparatus that by filtering and by the automatic admixture of chemicals will clarify the most impure water and also in devices in connection therewith for washing out such apparatus from time to time for removing the impurities collected therein; and with the above objects in view my invention consists of the novel devices and combinations of devices hereinafter described and specifically claimed.

Figure 1:
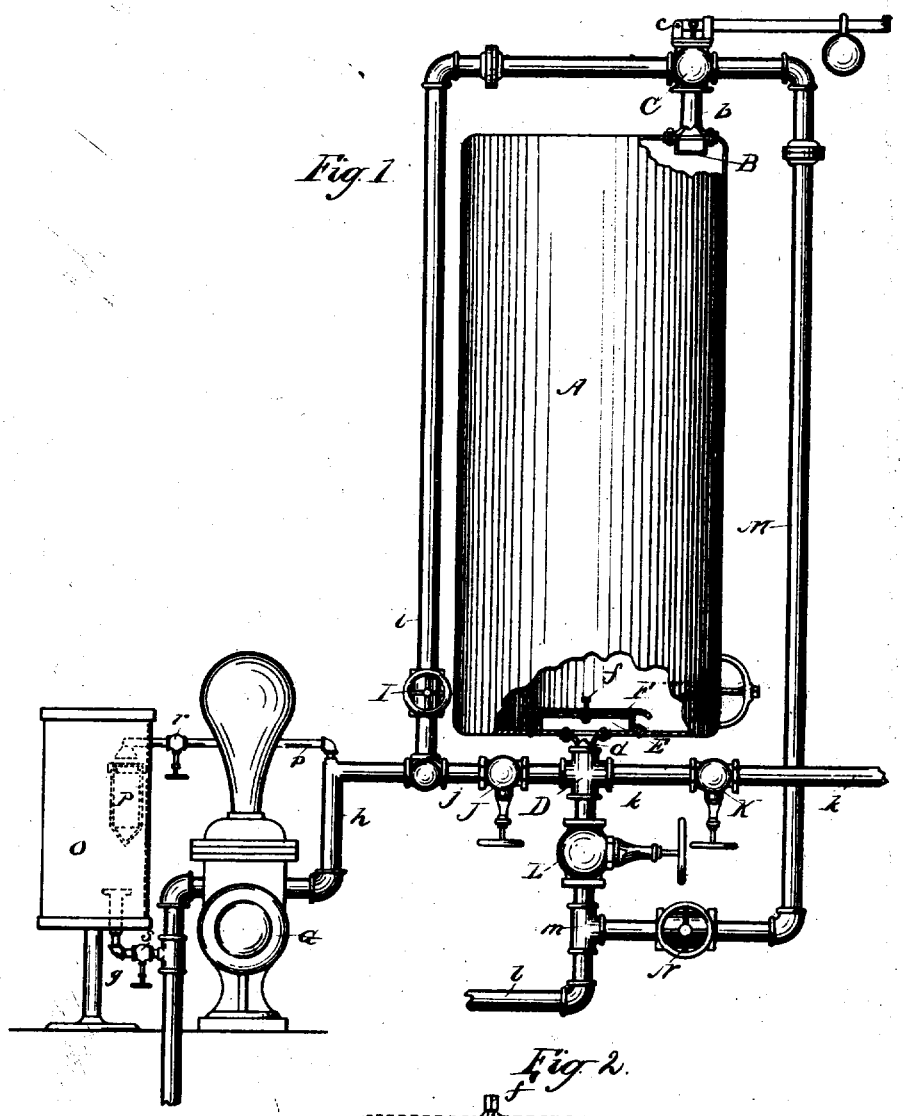
Figure 2:
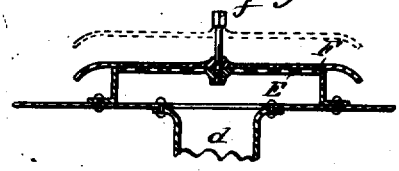

In the accompanying drawings, Figure 1 represents a sectional elevation of the entire apparatus, and Fig. 2 a section of the bottom of the filtering-tank on an enlarged scale.

Corresponding letters in the several figures of the drawings designate like parts.

A denotes the tank, being a cylindrical vessel made of sheet metal. Below the top of this vessel is secured a box, B, having a perforated bottom and communicating through a nozzle, *b*, with a globe, C, having to its top a safety-valve, *c*, of any usual construction. In its bottom the tank A communicates, through a short nozzle, *d*, with a cross-coupling, D, and above this nozzle *d* is secured, upon the bottom of said tank, a strainer, E, by circumferential vertical flanges, that provide a sufficient chamber below such strainer for water filtering through to collect therein before flowing off through nozzle *d*. On top of this strainer E is placed a disk, F, having perforations much finer than those in strainer E, and this disk F is secured by a bolt, *f*, passed through a central hole of the disk and tapped into the central portion of strainer-plate E, and this bolt *f* is sufficiently long for disk F to move up and down to be guided thereon.

The tank A is to be filled with fine gravel and sand for the water to filter through.

G is the feed-pump, and *g* the suction-pipe thereof. This pump, through pipes *h i*, communicates with globe C, and, through the pipes *h j*, with the cross-coupling D, whence a pipe, *k*, leads to the boilers, or to a tank from which the boilers are fed by means of an injector. Cross-coupling D also communicates, through a globe-valve, L, with a pipe, *l*, that leads outdoors into the sewer or river. A globe-valve, I, is interposed in pipe *i*, another globe-valve, J, is interposed in pipe *j*, and a third globe-valve, K, is interposed in pipe *k*. A pipe, M, leads from globe C to a T-coupling, *m*, interposed in pipe *l* below globe-valve L, and this pipe M is provided with a globe-valve, N.

For filtering water through tank A to be used as feed-water for the boilers, the valves J, L, and N are closed and the valves I and K are opened, when the water will be forced through pipes *h i* and through strainer B into the top of tank A, and will pass through the sand and gravel therein, where it will be separated from all impurities, and the clear water will then pass through strainers F and E and through pipe *k* into the boilers.

For washing out the tank A, to remove the impurities collected therein from filtering, I close valves I, K, and L and open valves J and N, when the water from the pump will be forced through pipes *h j*, thence upward through strainers E F, through the gravel and sand in the tank and through the strainer B, and will thence be discharged through pipes M and *l*, and while the course of the water is thus reversed the perforated disk F will be lifted by the force thereof to allow a more free passage of the water and to remove any slimy impurities that might have gathered between such plates, and at the same time with passing through the sand and gravel the water will whirl up the same, carrying with it all impurities collected therein. After the tank has thus been washed out, by reversing the flow of the water passed through it, I again close valves N J and open valves I L, for discharging through pipe *l* into the sewer the first water filtered through the tank again in a downward direction for carrying off such impurities that may have been retained in the bottom of the tank from the water forced upward therethrough for washing out, until the filtered water shows to be clear, when I close L and open valve K again. The perforated box B may also be filled with gravel for retaining coarser matter that otherwise might clog up the perforations of such box.

At one side of the pump G is a hermetic tank, O, inside of which is provided a funnel, P, having a conical perforated bottom and open at the top. A small pipe, *p*, leading from the pipe *h* into the vessel O provides for communication between the vessel and the pipe, and a small sprinkler on the end of the pipe is arranged above the funnel-pipe P, thereby providing for a discharge into the top of the funnel. The pipe *p* is provided with a valve or stop-cock, *r*, between the tank and the pipe *h*. A small pipe, *q*, leading from the suction-pipe *g* of the pump into and through the bottom of the vessel O, establishes communication between this vessel and the suction-pipe of the pump. This pipe *q* is also provided with a valve or stop-cock, *s*, between the tank and the suction-pipe.

The tank or vessel O is for the reception of alum or any other chemical which it is desired to mix with the water for the purpose of coagulating impurities or foreign substances contained therein, and the pipes connecting this vessel with the suction and discharge pipes of the pump are for the purpose of feeding the chemical constantly into the water before it passes into the pump and keeping up a constant supply of water to the passage for dissolving the chemical. Through a suitable opening in the tank or vessel O the funnel P is filled with alum or other chemical which it is desired to use, and the valves *r* and *s* are opened. Then if the pump is in action, at each stroke the pressure upon the discharge-pipe will force the same water through the pipe *p* into the vessel O, where it is discharged upon the alum or other chemical and dissolves it. The valve *s* being open, the chemical-tank is also in communication with the suction-pipe of the pump, and, obviously, by the action of the latter a certain quantity of the solution will be drawn into the suction-pipe and through this pipe into the pump with each stroke of the latter, and by the agitation of the water in its passage through the pump the chemical solution will become thoroughly mixed with the water forced to the filtering-tank.

The supply of water to the tank through the pipe *p* and the supply of chemical solution to the suction-pipe through the pipe *q* are regulated by means of the valves *r* and *s*, and it is obvious that the action of the apparatus is automatic in keeping up the supply of chemical matter to the water in such quantity as may be desired.

Man or hand holes are provided in tank A for filling the same with gravel and sand and for emptying when necessary.

With an apparatus as the above described the most impure river-water can be clarified to be applicable as feed-water for steam-boilers and other purposes with the very best results.

What I claim is—

1. In an apparatus for the purpose described, the tank A, provided with strainers B and E, the strainer B communicating with the pump through pipes *h* and *i*, and the strainer E with the boilers through pipe *k*, substantially as set forth.

2. In an apparatus for the purpose described, the tank A, with strainers B and E, the strainer B communicating with the pump through pipes *h i* and with the sewer through pipes M *l*, and strainer E communicating with the pump through pipes *h j* and with the boilers through pipe *k*, such pipes being provided with suitable valves for regulating and reversing the circulation of the water through such tank, substantially as set forth.

3. In an apparatus for the purpose described, the tank A, with strainers B and E, strainer B communicating with the pump through pipes *h i*, provided with valve I, and with the sewer through pipes M *l*, provided with valves L N, and strainer E communicating with the pump through pipes *h j*, provided with valve J, and with the boilers through pipe *k*, provided with valve K, all substantially as set forth, for the purpose specified.

4. In an apparatus for the purpose described, the combination, with the filtering-tank, of perforated plate E in the bottom thereof, and perforated disk F on top of plate E, vertically movable and guided on bolt *f*, substantially as and for the purposes specified.

5. The combination, with the filtering-tank and the force-pump feeding the same, of chamber O, with perforated funnel P, a pipe, *p*, leading from the discharge-pipe of the pump into funnel P, and a pipe, *q*, leading from the bottom of chamber O into the suction-pipe of the pump, substantially as and for the purposes specified.

6. In a filtering apparatus, a filtering-tank, in combination with a pump and a vessel for chemicals communicating with the suction-pipe of the pump, substantially as and for the purposes specified.

7. In a filtering apparatus, a filtering-tank, in combination with a pump and a vessel for chemicals communicating with both the inlet and the outlet of the pump, substantially as and for the purposes specified.

8. In a filtering apparatus, a filtering-tank, in combination with a pump, a vessel for chemicals, a pipe connecting said chemical-receptacle with the suction-pipe of the pump, and a second pipe connecting said vessel with the discharge-pipe of the pump, substantially as and for the purposes specified.

OMAR H. JEWELL.

Witnesses:
CARRIE FEIGEL,
A. M. BEST.